(12) United States Patent
Yu et al.

(10) Patent No.: US 11,287,660 B2
(45) Date of Patent: Mar. 29, 2022

(54) HEAD-MOUNTED DISPLAY

(71) Applicant: Wistron Corp., New Taipei (TW)

(72) Inventors: Lee Hua Yu, New Taipei (TW); Pei Hsin Huang, New Taipei (TW); Tsu-Yin Jen, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/390,342

(22) Filed: Apr. 22, 2019

(65) Prior Publication Data
US 2020/0225493 A1    Jul. 16, 2020

(30) Foreign Application Priority Data

Jan. 15, 2019   (TW) .................................. 108101494

(51) Int. Cl.
*G02B 27/01*   (2006.01)
(52) U.S. Cl.
CPC ..... *G02B 27/0176* (2013.01); *G02B 27/0179* (2013.01); *G02B 2027/0154* (2013.01); *G02B 2027/0178* (2013.01); *G02B 2027/0187* (2013.01)

(58) Field of Classification Search
CPC ............ G02B 27/0176; G02B 27/0179; G02B 27/0093; G02B 27/01; G02B 2027/0154; G02B 2027/0178; G02B 2027/0187; G06F 3/011; G06F 3/012; G06F 3/013; G06F 1/163
See application file for complete search history.

(56) References Cited

U.S. PATENT DOCUMENTS

| | | | |
|---|---|---|---|
| 5,486,841 A | * | 1/1996 | Hara ........................ G02B 7/12 345/8 |
| 9,696,552 B1 | * | 7/2017 | Goergen .................. A42B 1/24 |
| 2017/0357333 A1 | * | 12/2017 | Balan .................... G06T 19/006 |
| 2018/0003919 A1 | * | 1/2018 | Song .................... G06K 9/0061 |
| 2019/0179409 A1 | * | 6/2019 | Jones ................. G02B 27/0093 |
| 2020/0019236 A1 | * | 1/2020 | Parkinson ............... G10L 15/22 |

FOREIGN PATENT DOCUMENTS

| | | |
|---|---|---|
| CN | 108124468 A | 6/2018 |
| TW | I534476 B | 5/2016 |

OTHER PUBLICATIONS

Taiwan Patent Office, "Office Action", Taiwan, Jul. 6, 2020.

* cited by examiner

*Primary Examiner* — William Boddie
*Assistant Examiner* — Jeffrey Parker
(74) *Attorney, Agent, or Firm* — Locke Lord LLP; Tim Tingkang Xia, Esq.

(57) ABSTRACT

This disclosure relates to a head-mounted display including a wearable component, a display device and at least one sensor. The display device is movably disposed on the wearable component. The at least one sensor is connected to the display device. A position of the display device is related to a sensing result of the at least one sensor.

11 Claims, 9 Drawing Sheets

HEAD-MOUNTED DISPLAY

CROSS-REFERENCE TO RELATED APPLICATIONS

This non-provisional application claims priority under 35 U.S.C. § 119(a) on Patent Application No(s). 108101494 filed in Taiwan, R.O.C. on Jan. 15, 2019, the entire contents of which are hereby incorporated by reference.

TECHNICAL FIELD

The present disclosure relates to a display, more particularly to a head-mounted display.

BACKGROUND

With the technology advances, augmented reality (AR) has been used in various fields, such as science, medical treatment, education and entertainment. The so-called augmented reality refers to a technology that superimposes computer-generated image on one's view of the real world, thus providing a composite view. A head-mounted display (HIVID), a type of computer display device for realizing the experience of augmented reality, becomes more and more diverse in the market.

In order to improve the user experience, the comfort and stability of wearing are also import topics in developing the head-mounted display.

SUMMARY

According to one aspect of the present disclosure, a head-mounted display including a wearable component, a display device and at least one sensor. The display device is movably disposed on the wearable component. The at least one sensor is connected to the display device. A position of the display device is related to a sensing result of the at least one sensor.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained unless the terms have a specific meaning in the present disclosure. Furthermore, in order to simplify the drawings, some conventional structures and components are drawn in a simplified manner to keep the drawings clean.

Further, the following embodiments are disclosed by the figures, and some practical details are described in the following paragraphs, but the present disclosure is not limited thereto. Furthermore, for the purpose of illustration, some of the structures and components in the figures are simplified, and wires, lines or buses are omitted in some of the figures. And the size, ratio, and angle of the components in the drawings of the present disclosure may be exaggerated for illustrative purposes, but the present disclosure is not limited thereto, and various modifications are allowed and can be made according to the following disclosure as long as it does not depart from the spirit of the present disclosure. Note that the actual size and designs of the product manufactured based on the present disclosure may also be modified according to any actual requirements.

Further, the terms, such as "end", "portion", "part", "area" and the like may be used in the following to describe specific components and structures or specific features thereon or therebetween, but are not intended to limit these components and structures. In the following, it may use terms, such as "substantially", "approximately" or "about"; when these terms are used in combination with size, concentration, temperature or other physical or chemical properties or characteristics, they are used to express that, the deviation existing in the upper and/or lower limits of the range of these properties or characteristics or the acceptable tolerances caused by the manufacturing tolerances or analysis process, would still able to achieve the desired effect.

Furthermore, unless otherwise defined, all the terms used in the disclosure, including technical and scientific terms, have their ordinary meanings that can be understood by those skilled in the art. Moreover, the definitions of the above terms are to be interpreted as being consistent with the technical fields related to the disclosure. Unless specifically defined, these terms are not to be construed as too idealistic or formal meanings. The terms of the components in the disclosure are sometimes referred to in a more concise manner, depending on the requirements of the description, and should be understood by the reader.

Figure 1:
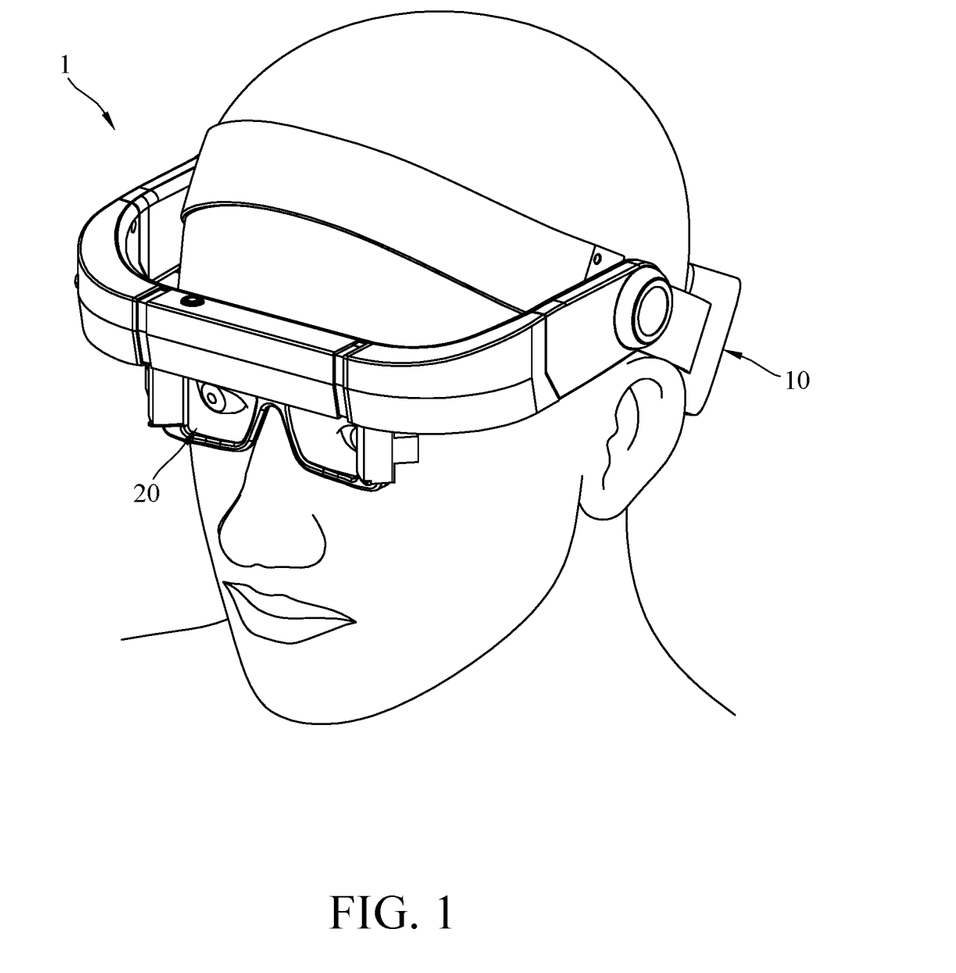
FIG. 1 is a perspective view of a head-mounted display according to one embodiment of the present disclosure while the head-mounted display being worn on human head.

Firstly, please refer to FIG. 1, which is a perspective view of a head-mounted display 1 according to one embodiment of the present disclosure with the head-mounted display 1 while being worn on human head. In this embodiment, the head-mounted display 1 is, for example but not limited to, a wearable device that features augmented reality (AR), and may include a wearable component 10, a display device 20 and at least one sensor (not shown in FIG. 1 but will be introduced later). Specifically, the wearable component 10 may be substantially in a ring shape and suitable for being worn on human head. The manner of wearing the wearable component 10 depends on the wearer, thus the wearable component 10 on the head may be high in front and low in back (as shown in the figures) or in a level manner, but the disclosure is not limited thereto. The display device 20 is movably assembled on the wearable component 10 and is the part of the head-mounted display 1 for providing virtual image. The aforementioned sensor may be directly or indirectly disposed on the display device 20. And the position of the display device 20 can be related to or changed according to the sensing result of the sensor, which will be also described later.

Figure 2:
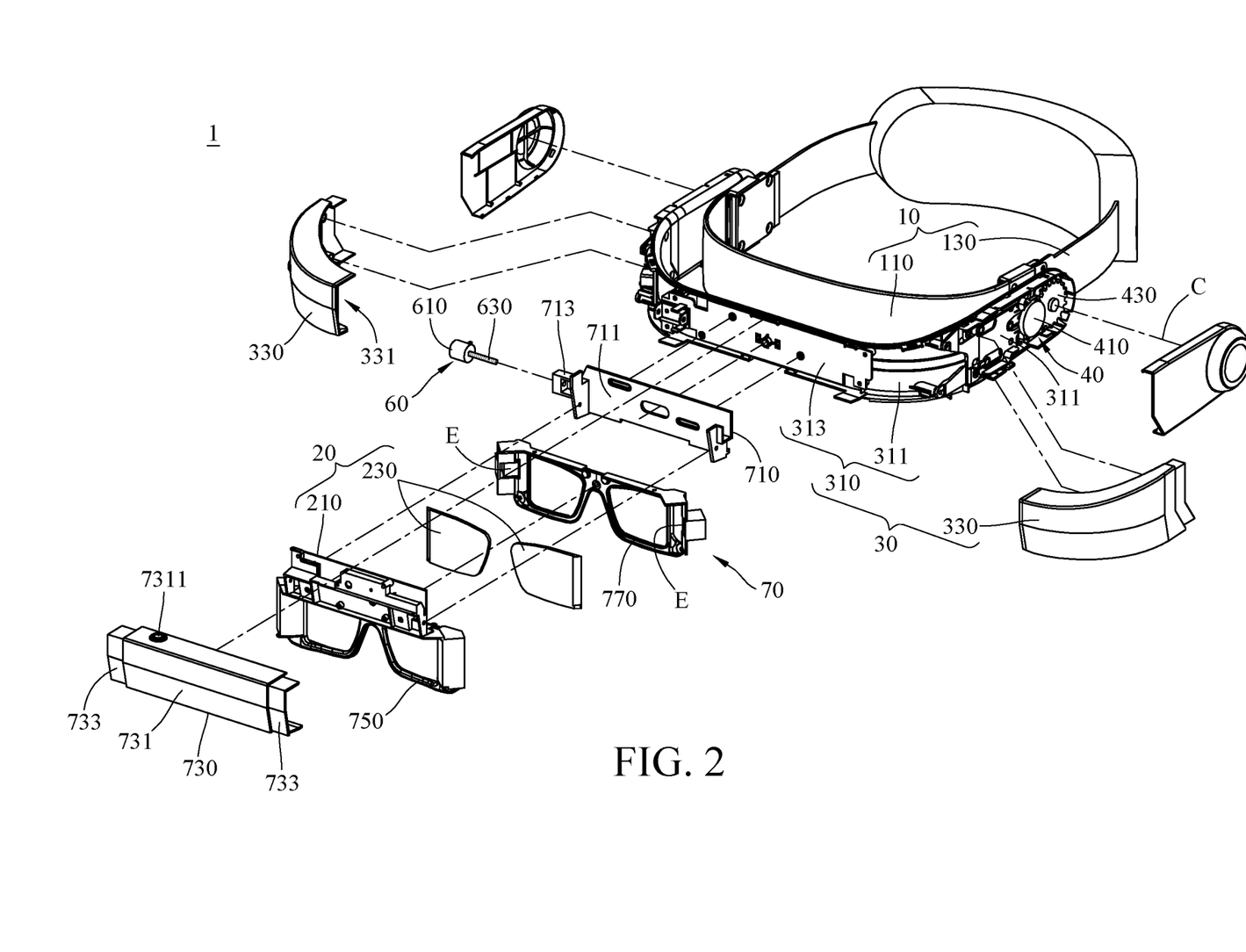
FIG. 2 to FIG. 3 are exploded views of the head-mounted display in FIG. 1 taken at different perspectives.
Figure 3:
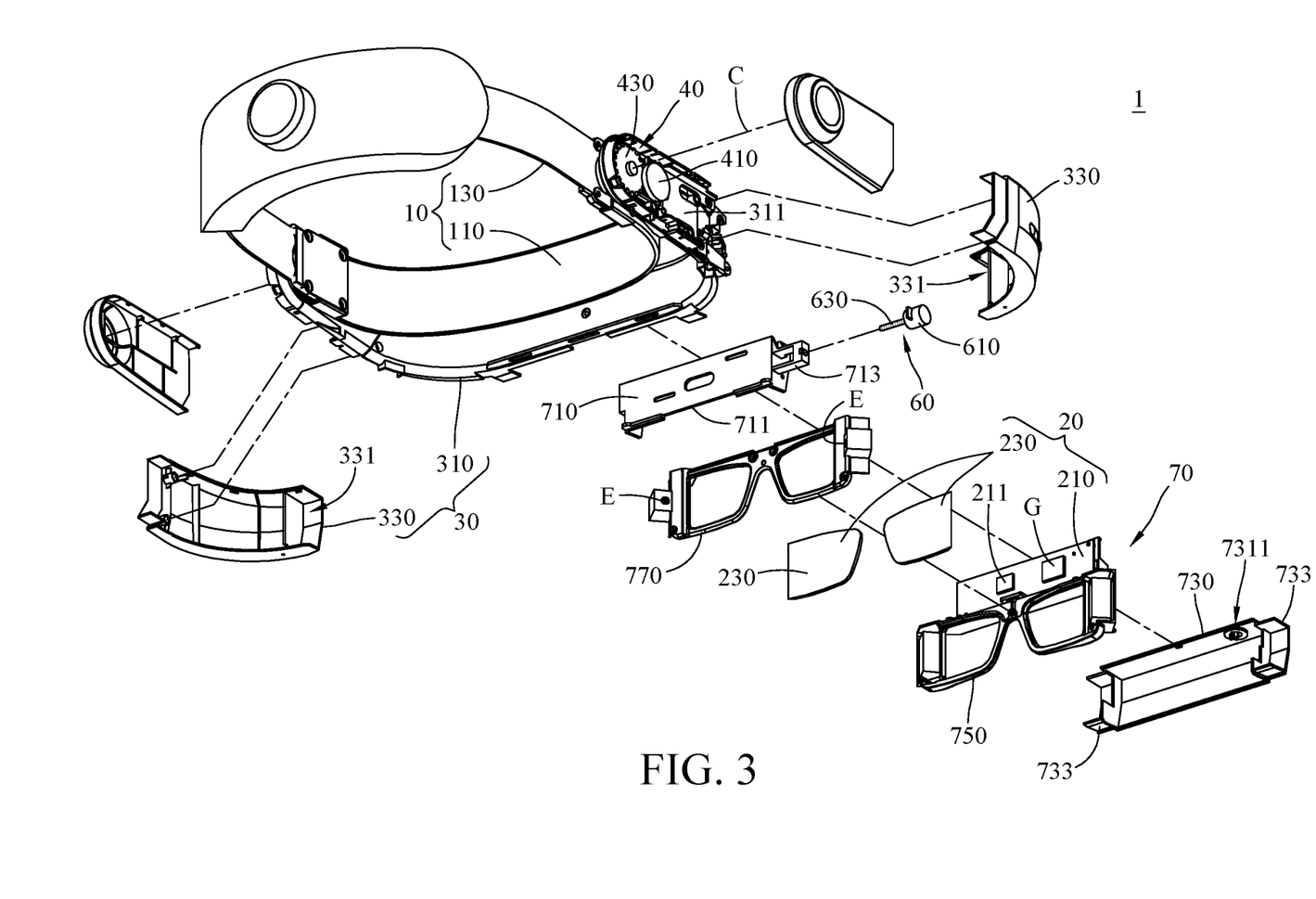

Further, please refer to FIG. 2 to FIG. 3, which are exploded views of the head-mounted display 1 taken at different perspectives. In this embodiment, the wearable component 10 may include a front head strap 110 and a rear head strap 130. The front head strap 110 and the rear head strap 130 are detachably or non-detachably connected to each other to form a ring-shaped structure suitable for being worn on human head. As the wearable component 10 is worn on human head, the front head strap 110 may be rest on or near the forehead, and the rear head strap 130 may be placed on or near the lower back of the head. However, the present disclosure is not limited by the design of the wearable component 10, and any other designs of the wearable component that are suitable for being worn on human head belong to the scope of the present disclosure.

Further, in this or some embodiments, there may be an auxiliary pack (not numbered) disposed on the rear head strap 130 and located opposite to the display device 20. The auxiliary pack may contain a battery and/or other auxiliary or expansion components configured to enhance or increase the functionality and usability of the head-mounted display 1. In addition, the auxiliary pack also helps the head-mounted display 1 to achieve a weight balance between front and back. However, the auxiliary pack is optional, and the disclosure is not limited thereto.

In this embodiments, the head-mounted display 1 may further include a base assembly 30 and at least one first driving component 40. The base assembly 30 is pivotably disposed on the junction of the front head strap 110 and the rear head strap 130, but the disclosure is not limited to where the base assembly 30 is connected to the wearable component 10. In addition, the base assembly 30 can be pivoted relatively to the wearable component 10 by being driven by the first driving component 40 so that the display device 20 disposed on the base assembly 30 can also be pivoted relatively to the wearable component 10. Specifically, the base assembly 30 may include a base part 310 located at a side of the front head strap 110 facing away from the rear head strap 130, the display device 20 is disposed on the base part 310, and the base part 310 is able to be pivoted relatively to the front head strap 110 by being driven by the first driving component 40, such that the display device 20 is also able to be pivoted relatively to the wearable component 10.

Further, the base part 310 may include a rear shell 311 and a mount plate 313. The rear shell 311 is connected to the front head strap 110 of the wearable component 10 and can be moved by the first driving component 40. The rear shell 311 is also in a curved shape similar to that of the front head strap 110, and most part of the rear shell 311 is spaced apart from the front head strap 110 except for the junction of the rear shell 311 and the front head strap 110. In addition, in this embodiment, the rear shell 311 may be consisted of a plurality of segments (not numbered) that can be constructed to be retractable shell, such that the rear shell 311 can be retracted or extended to adjust the distance between the rear shell 311 and the front head strap 110. The mount plate 313 is fixed on a side of the rear shell 311 facing away from the wearable component 10, and the display device 20 may be directly or indirectly disposed on the mount plate 313.

Figure 4:
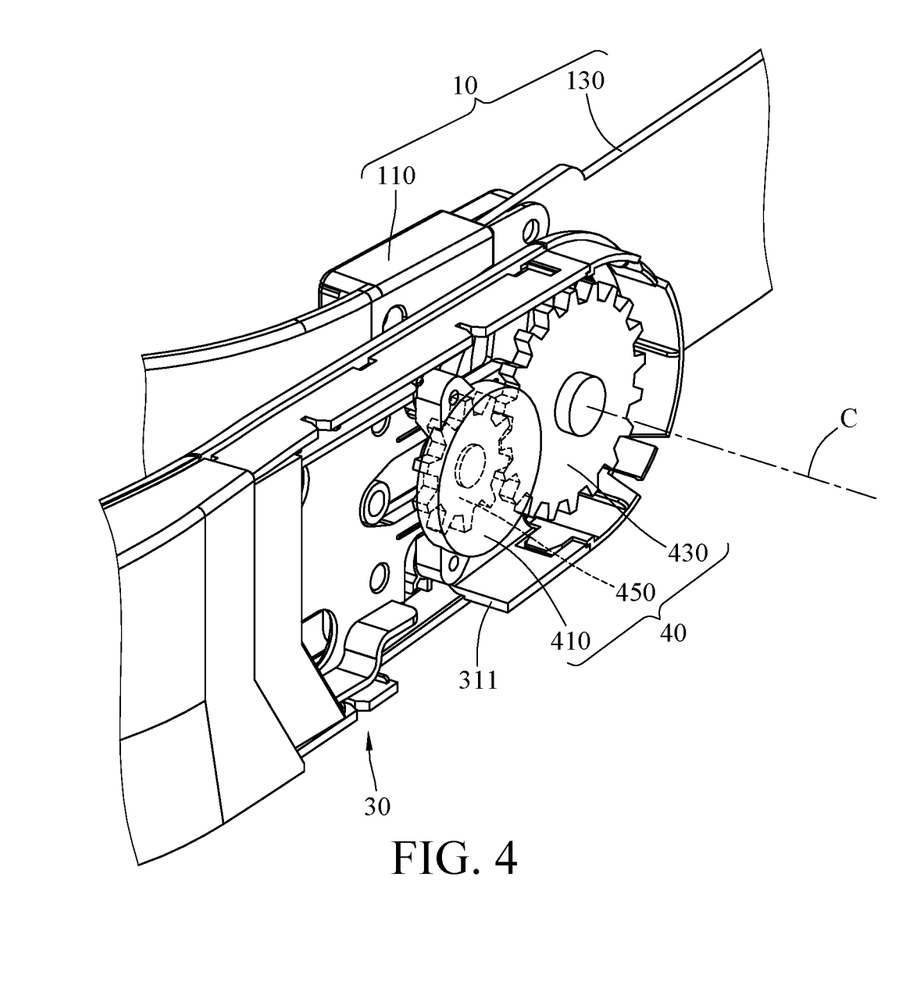
FIG. 4 is a partially enlarged view of the head-mounted display in FIG. 2.

Further, please refer to FIG. 2 and further refer to FIG. 4 to see a partially enlarged view of the head-mounted display 1. In this or some embodiments, the first driving component 40 may include a power source 410, a fixed gear 430 and a driver gear 450. The power source 410 may be, for example but not limited to, a motor and may be fixed on a side of the rear shell 311 of the base assembly 30 facing away from the front head strap 110. The fixed gear 430 is non-pivotably fixed on the front head strap 110 or the rear head strap 130 and is also located on the side of the rear shell 311 of the base assembly 30 facing away from the front head strap 110. The driver gear 450 is mounted on the power source 410 and can be rotated by the power source 410. The driver gear 450 is located between the rear shell 311 and the power source 410; that is, the driver gear 450 is also located at the side of the rear shell 311 facing away from the front head strap 110. The driver gear 450 is meshed with the fixed gear 430, and therefore, while the power source 410 drives the driver gear 450 to pivot, the driver gear 450 can be sequentially meshed with the teeth (not numbered) of the fixed gear 430 so as to be moved along the circumference of the fixed gear 430 about a pivot axis C. Accordingly, the base assembly 30 and the display device 20 which is disposed on the mount plate 313 are also able to be pivoted relatively to the wearable component 10 about the pivot axis C. Herein, the pivot axis C is substantially the central axis of the fixed gear 430.

Further, in this embodiment, the head-mounted display 1 may further include a second driving component 60 and a frame 70. The frame 70 is slidably disposed on the wearable component 10 and can be slid relatively to the wearable component 10 by being driven by the second driving component 60. The display device 20 is disposed on the frame 70 so that the display device 20 is also able to be slid relatively to the wearable component 10. Specifically, the second driving component 60 is fixed on the mount plate 313 of the base assembly 30; the frame 70 is slidably disposed on the mount plate 313 of the base part 310 of the base assembly 30 and connected to the second driving component 60 so that the frame 70 and the display device 20 which is disposed on the frame 70 can be slid relatively to the base assembly 30 and the wearable component 10 by the second driving component 60.

Further, in this embodiment, the second driving component 60 may include a power source 610 and a screw rod 630. The power source 610 may be, for example but not limited to, a motor and may be fixed on the mount plate 313 of the base assembly 30. The screw rod 630 is fixed to the power source 610 and can be rotated by the power source 610. The screw rod 630 is engaged with the frame 70, and therefore, while the power source 610 drives the screw rod 630 to rotate, the frame 70 can be moved along the axis of the screw rod 630, such that the display device 20 disposed on the frame 70 can be linearly moved relatively to the wearable component 10.

Furthermore, in this embodiment, the display device 20 may include a motherboard 210 and at least one optical module 230. For the purpose of simplicity, the detailed structure and electronic component on the motherboard 210 are omitted from the figures and the optical module 230 is illustrated in a relatively simple manner; that is, the motherboard 210 and the optical module 230 actually may be more complicated in appearance, but the present disclosure is not limited thereto. The frame 70 may include a movable rear plate 710, a movable front cover 730, a front frame 750 and a rear frame 770, and the movable rear plate 710 may include an assembly part 711 and a mount 713. Please refer to FIGS. 2-3 and further refer to FIG. 5 to see another partially exploded view of the head-mounted display 1. The movable front cover 730 is slidably assembled on the mount plate 313 of the base assembly 30, the assembly part 711 of the movable rear plate 710 is assembled on the movable front cover 730 and is located between the movable front cover 730 and the mount plate 313, and the mount 713 of the movable rear plate 710 is located at a side of the assembly part 711 and is engaged with the screw rod 630 of the second driving component 60. As such, the movable front cover 730 can be moved as the second driving component 60 moves the movable rear plate 710. In addition, the assembly part 711 and the mount 713 may be, but are not limited to, made of a single piece.

Figure 5:
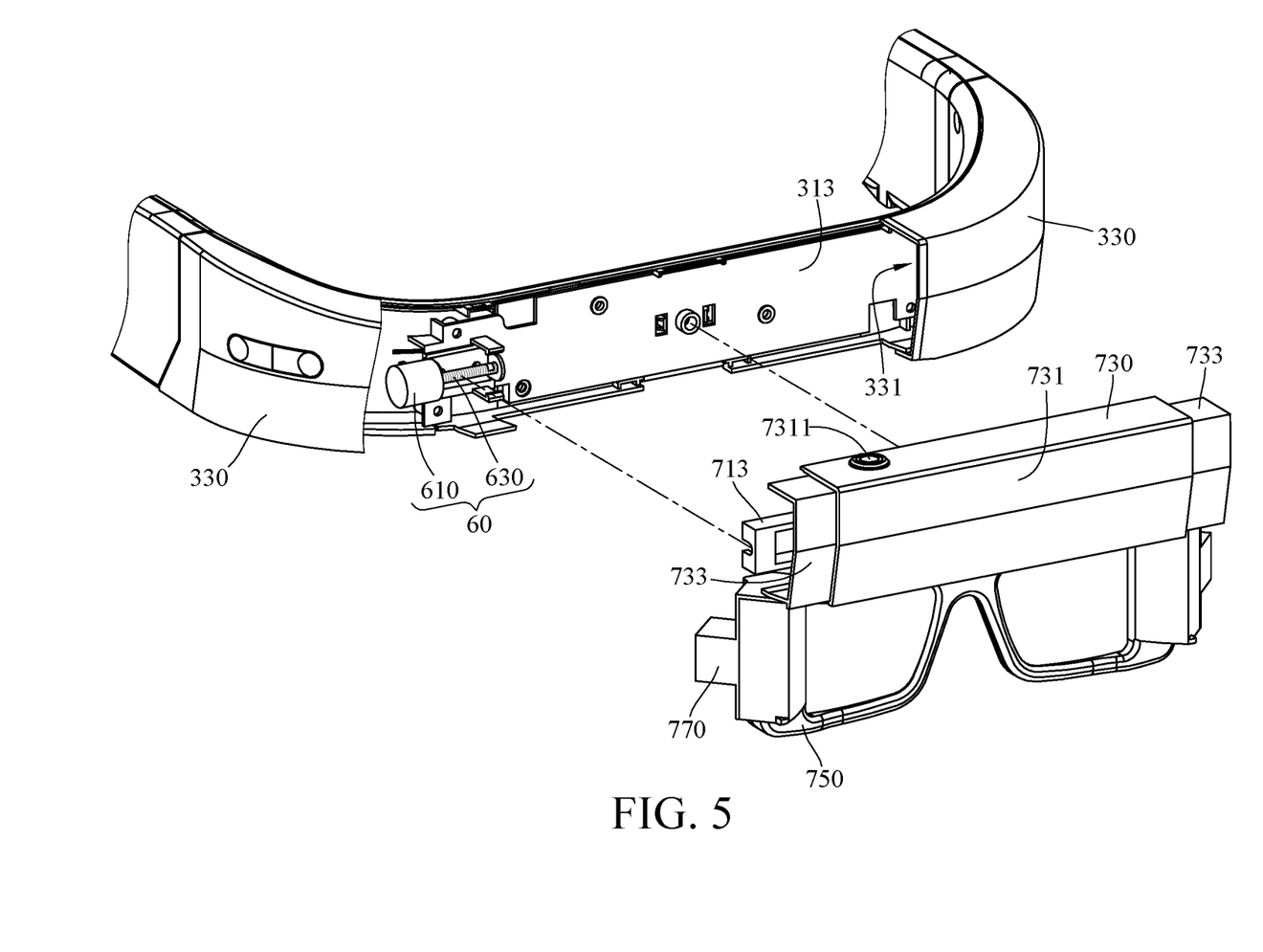
FIG. 5 is a partially exploded view of the head-mounted display in FIG. 1.

The front frame 750 is fixed on the movable front cover 730 so that the front frame 750 is able to be moved with the movable front cover 730. The front frame 750 is similar to the frame of the glasses. The motherboard 210 of the display device 20 is fixed on the front frame 750 and is located at the inner side of the movable front cover 730. Specifically, the movable front cover 730 may include a cover portion 731 configured to cover and protect the motherboard 210. In this embodiment, the quantity of the optical modules 230 is two, and the optical modules 230 are assembled on the front frame 750. The cooperation of the optical modules 230 and the motherboard 210 can provide virtual images to the user, but the present disclosure is not limited by the technology of creating virtual image. In addition, the quantity of the optical modules 230 is not restricted; in other embodiments, the head-mounted display may only include one optical module 230.

In this and some embodiments, a control center 211 and at least one gravity sensor G may be disposed on the motherboard 210. The control center 211 may be, but not limited to, a processor or a microprocessor electrically connected to the power sources 410 and 610, and the control center 211 is able to activate or deactivate the power sources 410 and/or 610 according to the stored data, received signals or instructions. In addition, the control center 211 may also be able to instruct the optical modules 230 to generate the required content. The gravity sensor G can be used to determine the relationship between itself and the gravity direction, and uses it to determine the inclination of the motherboard 210 or the optical modules 230 of the display device 20. Specifically, the gravity sensor G can be used to determine whether the motherboard 210 or the optical modules 230 are in an upright position, and the result would be transmitted to the control center 211 to be as the basis of how to operating the power source 410. The optical modules 230 in the upright position means that the optical modules 230 or the front frame 750 or motherboard 210 where the optical modules 230 is disposed on is determined to be in a state that is substantially upright and perpendicular to a horizontal plane. In other words, the inclination of the optical modules 230, the front frame 750 or the motherboard 210 relative to the wearable component 10 is associated with the sensing result of the gravity sensor G.

Figure 6:
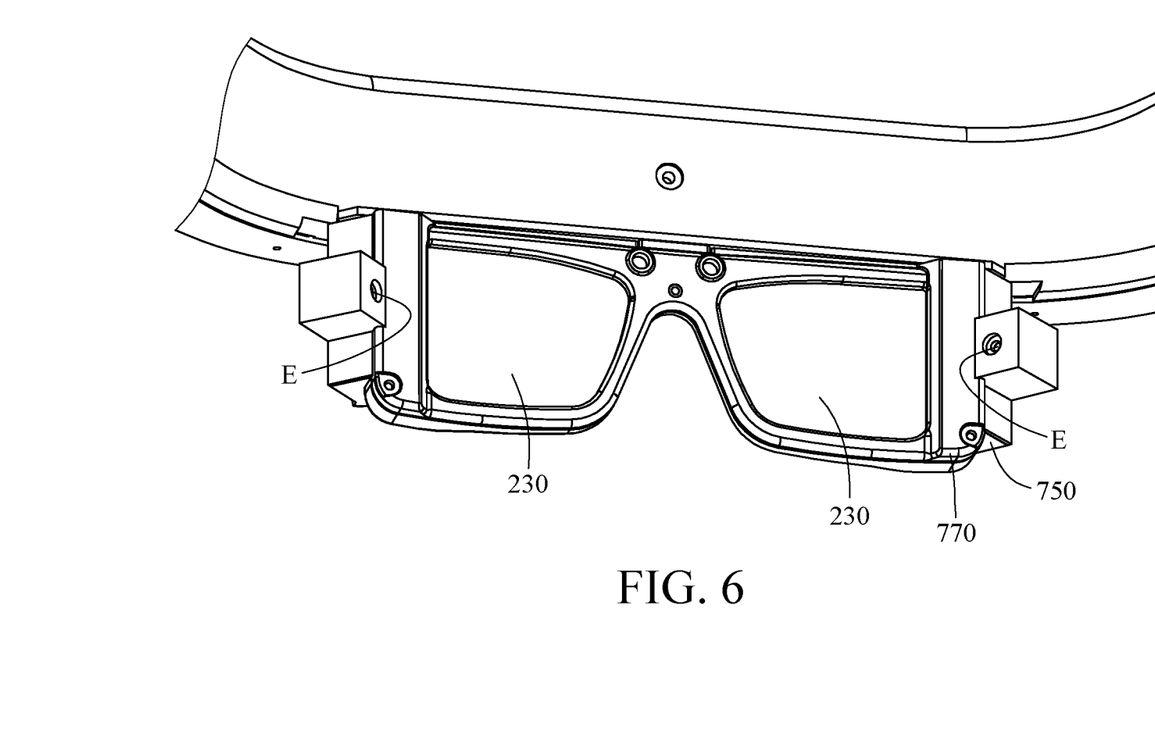
FIG. 6 is a partial perspective view of the inner side of the head-mounted display in FIG. 1.

The rear frame 770 is also similar to the frame of the glasses and can be assembled on the inner side of the front frame 750. Please also refer to FIG. 6 to see a partial perspective view of the inner side of the head-mounted display 1. In this and some embodiments, the head-mounted display 1 may further include at least one eye-tracking sensor E. In this embodiment, the head-mounted display 1 includes two eye-tracking sensors E respectively disposed on two opposite sides of the rear frame 770. However, the present disclosure is not limited by the quantity of the eye-tracking sensors E; in some embodiments, the head-mounted display may only include one eye-tracking sensor E. The eye-tracking sensors E are electrically connected to the control center 211 of the motherboard 210 and can be used to detect the position of eyeballs and generate a result to the control center 211. The sensing result of the eye-tracking sensors E will be a basis for the control center 211 to operate the power source 610. In addition, the principle axes of lenses of the two eye-tracking sensors E are at least at an angle, and this helps to improve the accuracy of detecting the position of eyeballs. However, the angle should be determined by actual requirements, and the present disclosure is not limited thereby.

In addition, in this embodiment, the base assembly 30 may further include two front shells 330 which are respectively disposed on two opposite sides of the rear shell 311 of the base part 310. Two opposite sides of the frame 70 are respectively movably inserted into the front shells 330, and therefore the frame 70 is restricted between the front shells 330. Specifically, the front shells 330 may each have a groove 331, and the movable front cover 730 of the frame 70 may include two insertion portions 733 which are respectively movably located in the groove 331 of the front shells 330, and this configuration can restrict and guide the movement of the movable front cover 730.

In addition, in this embodiment, the cover portion 731 may have a hole 7311 for the installation of a button (not numbered) electrically connected to the motherboard 210. The button may be a power button, a reset button or other function buttons, but the present disclosure is not limited thereby.

In this and some embodiments, the position of the display device 20 relative to the wearable component 10 can be adjusted by the power source 410 and/or power source 610 according to the sensing result of the gravity sensor G and/or the eye-tracking sensors E. The operation of the head-mounted display 1 will be described below.

Figure 7:
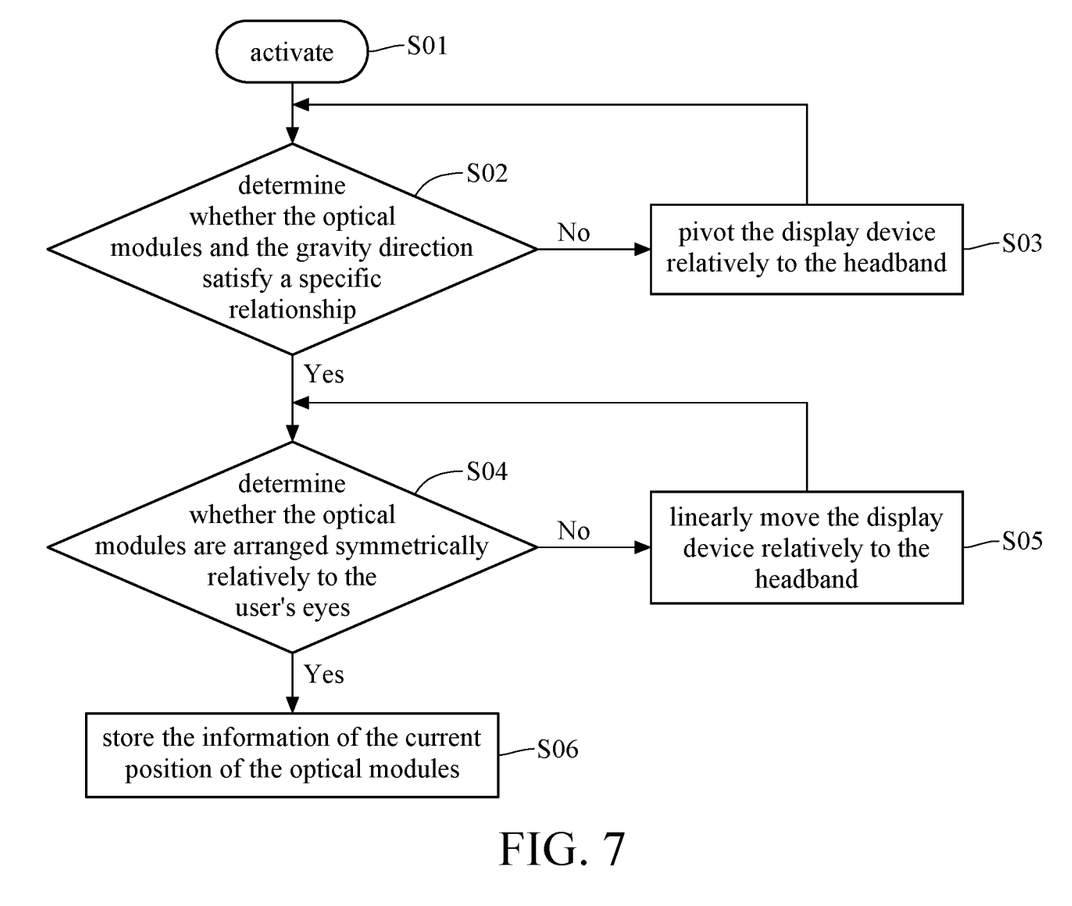
FIG. 7 is a block diagram showing the operation processes of the head-mounted display in FIG. 1.
Figure 8:
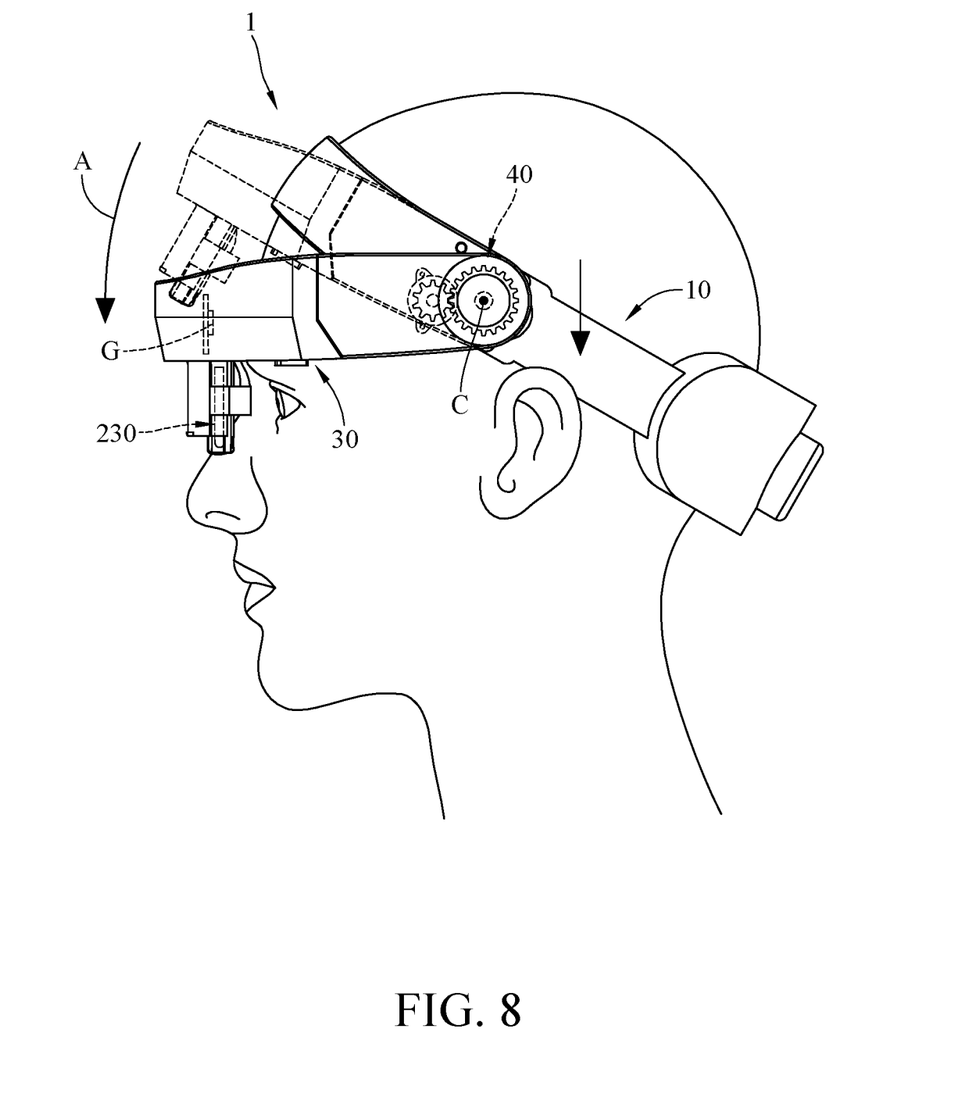
FIG. 8 is a schematic view showing that an optical module of the head-mounted display in FIG. 1 is pivoted to a specific position.
Figure 9:
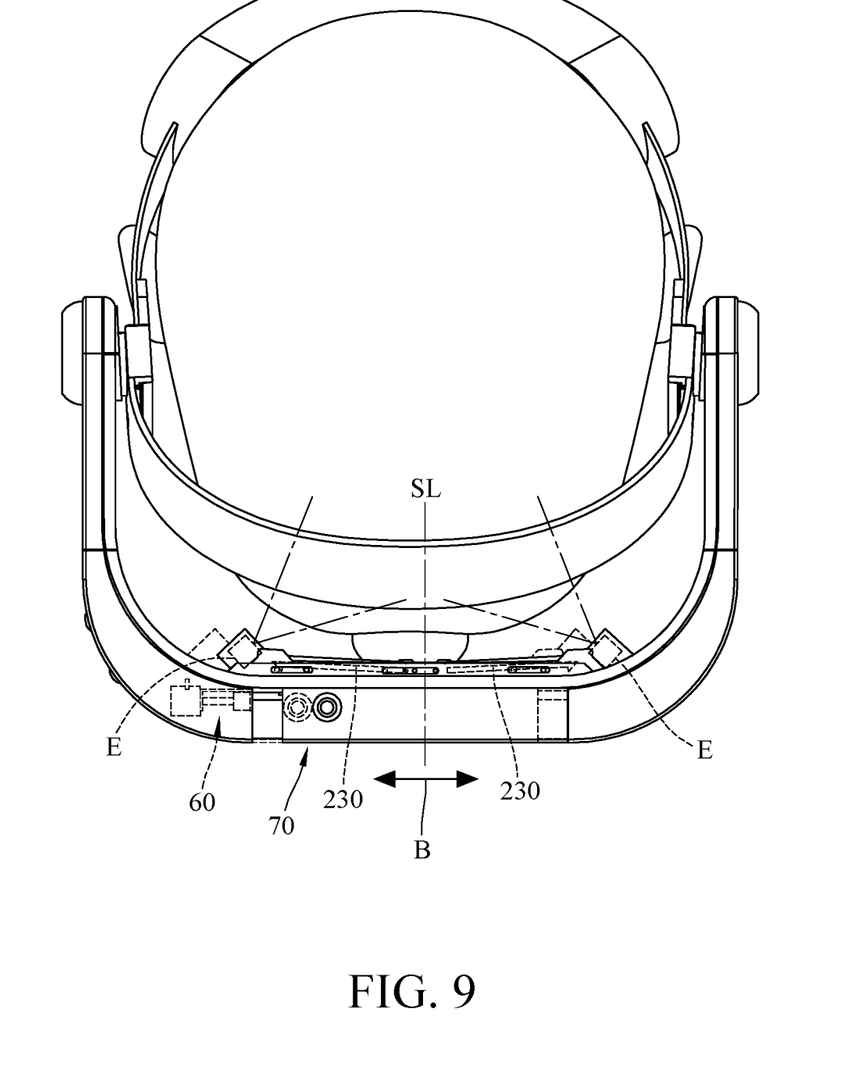
FIG. 9 is a schematic view showing that the optical module of the head-mounted display in FIG. 8 is moved to a position corresponding to the eyes.

Please refer to FIG. 7 and further refer to FIG. 8 to FIG. 9, FIG. 7 is a block diagram showing the operation processes of the head-mounted display 1, FIG. 8 is a schematic view showing that the optical modules 230 is pivoted to a desired position while the head-mounted display 1 is worn on the head, and FIG. 9 is a schematic view showing that the optical modules 230 of the head-mounted display 1 is moved according to the positions of eyes. Please be noted that the movement of the optical modules 230 relative to the wearable component 10 can be considered as to be the movement of the display device 20 relative to the wearable component 10 since the optical modules 230 are part of the display device 20.

Firstly, as shown in FIG. 7 and FIG. 8, the wearable component 10 of the head-mounted display 1 was worn on the user's head before the operation. Then, in step S01, the user is allowed to activate the head-mounted display 1 by pressing the power button. At this moment, step S02 is performed to determine whether the optical modules 230 and the gravity direction satisfy a specific relationship. Specifically, in step S02, the control center 211 instructs the gravity sensor G to detect the relationship between the optical modules 230 and the gravity direction. The aforementioned specific relationship means that the optical modules 230 are in a state substantially parallel to the gravity direction; that is, a state that the optical modules 230 are substantially in an upright position. In the figures, the gravity direction, for example, is the direction pointing downward. Therefore, step S02 can be used to determine the inclination of the optical modules 230 relative to the wearable component 10. When the control center 211 determines that the optical modules 230 and the gravity direction do not satisfy the specific relationship, namely determines that the optical modules 230 are not upright (or not perpendicular to horizontal plane), according to the sensing result of the gravity sensor G, step S03 will be performed to pivot the optical modules 230 relatively to the wearable component 10.

Specifically, in step S03, the control center 211 operates the first driving component 40 according to the sensing result of the gravity sensor G so as to drive the base assembly 30 and the optical modules 230 thereon to pivot relatively to the wearable component 10 about the pivot axis C (e.g., the direction of arrow A in FIG. 8). Therefore, the optical modules 230 are pivoted to be in an upright position. Note that the amount and direction of pivoting the optical modules 230 are related to the sensing result of the gravity sensor G. In other words, the amount of pivoting of the optical modules 230 relative to the wearable component 10 is associated with the sensing result of the gravity sensor G.

Then, step S02 is performed again. If the control center 211 determines that the optical modules 230 are still not upright (namely not perpendicular to horizontal plane) according to the sensing result of the gravity sensor G, step S03 will be performed again. When the control center 211 determines that the optical modules 230 and the gravity direction satisfy the specific relationship, the optical modules 230 are upright. At this moment, as shown in FIG. 8, the optical modules 230 are approximately at the same level as the user's eyes, and the display surfaces (not numbered) of optical modules 230 are substantially located in front of the eyes and face the user's face so that the virtual information is viewable to the user.

At this moment, the user's eyes are located in the detection range of the eye-tracking sensors E of the head-mounted display 1. Then, as shown in FIG. 7 and FIG. 9, step S04 is performed to determine whether the optical modules 230 are arranged symmetrically relatively to the user's eyes. Specifically, in step S04, the control center 211 instructs the eye-tracking sensors E to detect the position of the eyes in order to determine the relative positional relationship between the optical modules 230 and the eyes. When the optical modules 230 are arranged symmetrically relatively to the eyes, the optical modules 230 substantially correspond to the eyes. In such a case, it can be determined that a symmetric center line SL of the optical modules 230 substantially passes through the root of nose; that is, the optical modules 230 are arranged symmetrically relatively to the user's nose. That is, step S04 is to determine the relative positional relationship between the symmetric center line SL of the optical modules 230 and the wearable component 10 or user's face. The aforementioned symmetric center line of the optical modules is a virtual reference line located between the optical modules and spaced apart from the optical modules by the same distance; in the case of single optical module, the symmetric center line would be a virtual reference line passing through the center of the single optical module.

When the control center 211 determines that the optical modules 230 are not arranged symmetrically relatively to the eyes according to the sensing result of the eye-tracking sensor E (namely the symmetric center line of the optical modules 230 does not pass through the root of nose), step S05 is performed to linearly move the optical modules 230 relatively to the wearable component 10. Specifically, in step S05, the control center 211 operates the second driving component 60 according to the sensing result of the eye-tracking sensor E so as to drive the frame 70 and the optical modules 230 thereon to slide relatively to the wearable component 10 (e.g., the direction of arrow B in FIG. 9). Note that amount and direction of sliding the optical modules 230 are related to the sensing result of the eye-tracking sensors E. In other words, the amount of sliding of the optical modules 230 relative to the wearable component 10 is associated with the sensing result of the eye-tracking sensors E.

Then, step S04 is performed again. If the control center 211 determines that the optical modules 230 are still not arranged symmetrically relatively to the eyes according to the sensing result of the eye-tracking sensors E, step S05 will be performed again. When the control center 211 determines that the optical modules 230 are arranged symmetrically relatively to the eyes, the optical modules 230 are approximately in the positions respectively corresponding to the user's eyes.

At this moment, the contents provided by the optical modules 230 are accurately viewable to the user, and the weight of the head-mounted display 1 on the head has also been confirmed to be balanced between the left and right sides, which helps to improve the comfortability while wearing and thus preventing the weight of the head-mounted display on head not balanced. As a result, the discomfort such as shoulder or neck pain is prevented.

Also, in this embodiment, the position of the optical modules 230 may be further adjusted manually in front-rear direction, for example, by slightly extending the rear shell 311, but the present disclosure is not limited thereto.

As the optical modules 230 are moved to a desired position, the user is allowed to perform step S06 to store the information of the current position of the optical modules 230 for the next time usage. Specifically, step S06 can be triggered by pressing the aforementioned function button so as to instruct the control center 211 to store the current position of the optical modules 230 in a storage unit (not shown) on the motherboard 210.

However, it is noted that the position of the head-mounted display 1 worn on the head may be different next time. Therefore, the head-mounted display 1 further provides a function to further adjust the position of the optical modules 230 after the optical modules 230 have been returned to the previous position. When such function is activated, the control center 211 will perform the aforementioned step S02 to S05.

It can be understood that the head-mounted display 1 may be moved out of the desired position due to the user's motion. In such a case, other than manual adjustment by the user, the head-mounted display 1 further provides a repeated adjusting function for repeatedly performing the step S02-S05 at a specific time interval so as to keep the optical modules 230 in the desired position. However, the present disclosure is not limited by the specific time interval or other adjusting ways for improving the user experience.

In addition, in this and some embodiments, except for the wearable component 10, the other parts of the head-mounted display 1 are not in contact with and spaced apart from the user's face. This prevents a large contact between the head-mounted display 1 and the user's face and thus preventing discomfort due to facial contact.

In addition, the head-mounted display may only include the component that can linearly move or pivot the display device relatively to the wearable component. For example, in some embodiments, the head-mounted display may omit the gravity sensor and the first driving component that is used to pivot the display device relatively to the wearable component; or in some other embodiments, the head-mounted display may omit the eye-tracking sensor and the second driving component that is used to slide the display device relatively to the wearable component.

As the head-mounted display discussed above, the display device can be automatically adjusted to a proper position according to the sensing result of the at least one sensor so that the weight of the display device is balanced between right and left sides, thereby avoiding discomfort and preventing the virtual information from going unviewable to the user.

In addition, except for the wearable component, the other parts of the head-mounted display are not in contact with and spaced apart from the user's face. This prevents the large contact between the head-mounted display and the user's face and thus preventing discomfort due to facial contact.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A head-mounted display, comprising:
   a wearable component;
   a display device comprising two separate optical modules;
   at least one sensor, fixed to the display device and comprising at least one gravity sensor and at least one eye-tracking sensor, wherein the at least one eye-tracking sensor corresponds to the optical modules;
   a base assembly, comprising a base part and two front shells, wherein the base part is pivotably disposed on the wearable component about an axis, the two front shells are respectively disposed on two opposite sides of the base part; and
   a frame, wherein the optical modules of the display device are both fixed to the frame so that a distance between the optical modules is fixed, and wherein the frame comprises a front cover;
   wherein a position of the display device is related to a sensing result of the at least one gravity sensor and the at least one eye-tracking sensor;
   wherein two opposite ends of the front cover of the frame are respectively movably inserted into the two front shells so that the front cover are movable between the front shells, and the front cover, the optical modules of the display device, the at least one gravity sensor, and the at least one eye-tracking sensor are together linearly movable along a direction substantially parallel to the axis of the base assembly with respect to the wearable component according to the sensing result of the at least one eye-tracking sensor.

2. The head-mounted display according to claim 1, wherein an inclination of the optical modules relative to the wearable component is related to the sensing result of the at least one gravity sensor.

3. The head-mounted display according to claim 1, wherein a position of a symmetric center line of the optical modules is related to the sensing result of the at least one eye-tracking sensor.

4. The head-mounted display according to claim 1, wherein the display device is pivotably disposed on the wearable component, and an amount of pivoting of the display device relative to the wearable component is related to the sensing result of the at least one gravity sensor.

5. The head-mounted display according to claim 1, further comprising a first driving component, wherein the first driving component is configured to drive the base assembly to pivot relatively to the wearable component, the at least one gravity sensor is disposed on the display device, and the display device activates the first driving component according to the sensing result of the at least one gravity sensor.

6. The head-mounted display according to claim 1, wherein an amount of sliding of the display device relative to the wearable component is related to the sensing result of the at least one eye-tracking sensor.

7. The head-mounted display according to claim 1, further comprising a second driving component, wherein the second driving component is configured to drive the frame to slide relatively to the base assembly, and the display device activates the second driving component according to a sensing result of the at least one eye-tracking sensor.

8. The head-mounted display according to claim 1, further comprising a first driving component, and a second driving component, wherein the first driving component is configured to drive the base assembly to pivot relatively to the wearable component about the axis, and the second driving component is configured to drive the frame to linearly slide relatively to the base assembly along the direction parallel to the axis of the base assembly.

9. The head-mounted display according to claim 8, wherein the display device activates the first driving component according to a sensing result of the at least one gravity sensor, and the display device activates the second driving component according to a sensing result of the at least one eye-tracking sensor.

10. The head-mounted display according to claim 9, wherein a position of a symmetric center line of the optical modules is related to the sensing result of the at least one eye-tracking sensor, and an inclination of the optical modules relative to the wearable component is related to the sensing result of the at least one gravity sensor.

11. The head-mounted display according to claim 1, wherein the frame comprises a front frame and a rear frame, and the optical modules are between the front frame and the rear frame.

* * * * *